Feb. 11, 1936.                I. HARTER                2,030,818
                    METHOD OF FORMING A PRESSURE VESSEL
                         Filed March 7, 1932            5 Sheets-Sheet 1
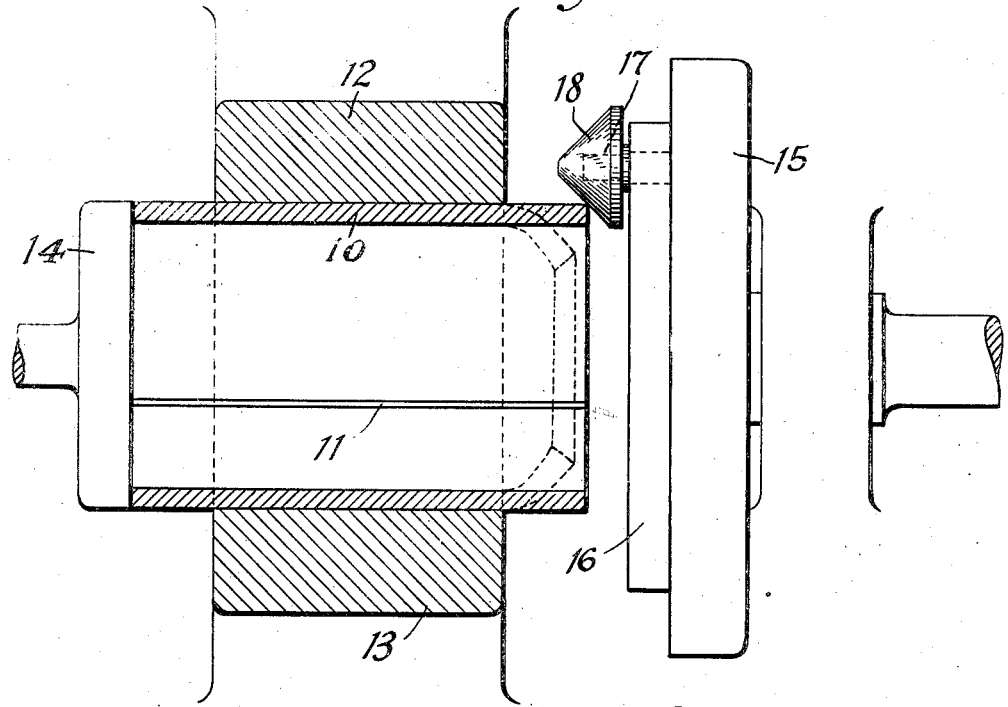
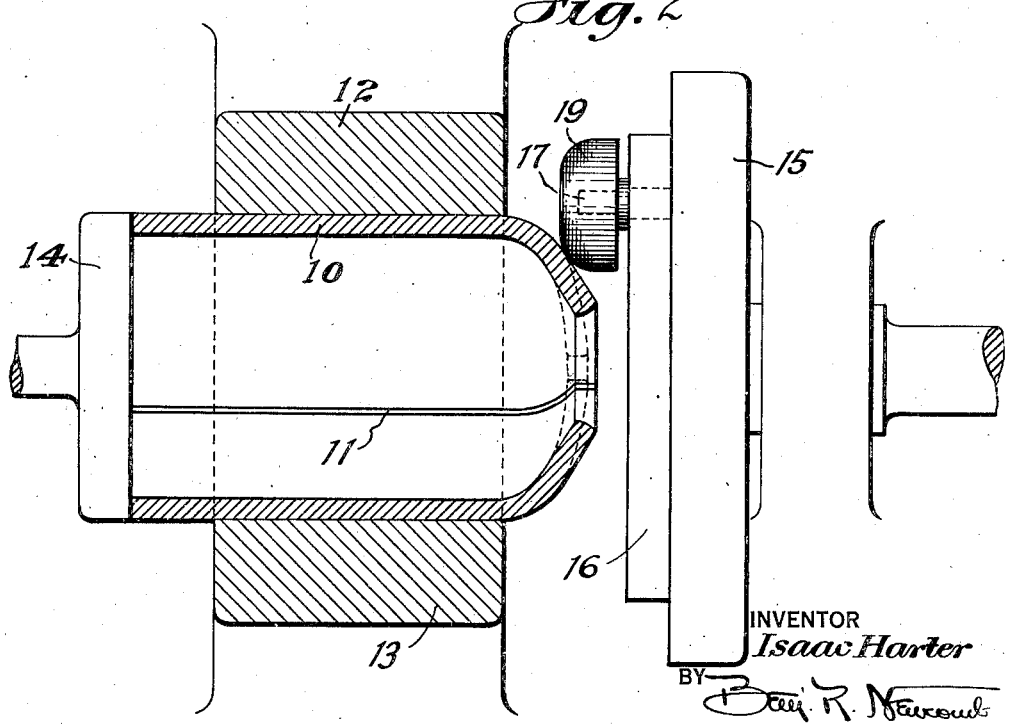
INVENTOR
*Isaac Harter*
BY
HIS ATTORNEY Feb. 11, 1936.                      I. HARTER                        2,030,818
                         METHOD OF FORMING A PRESSURE VESSEL
                              Filed March 7, 1932            5 Sheets-Sheet 2
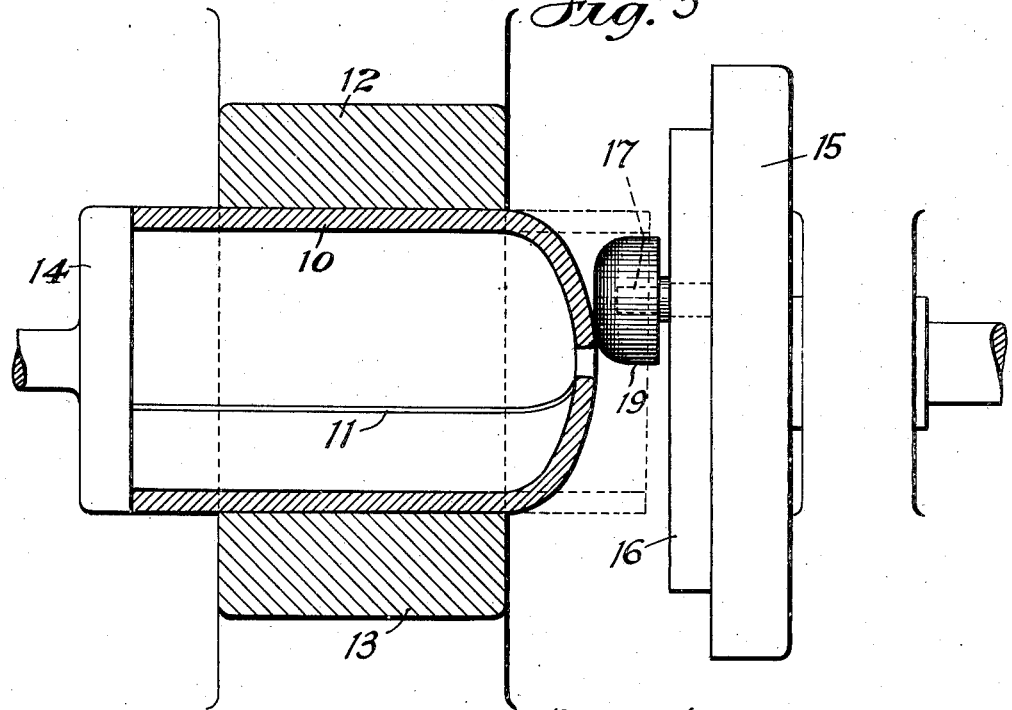
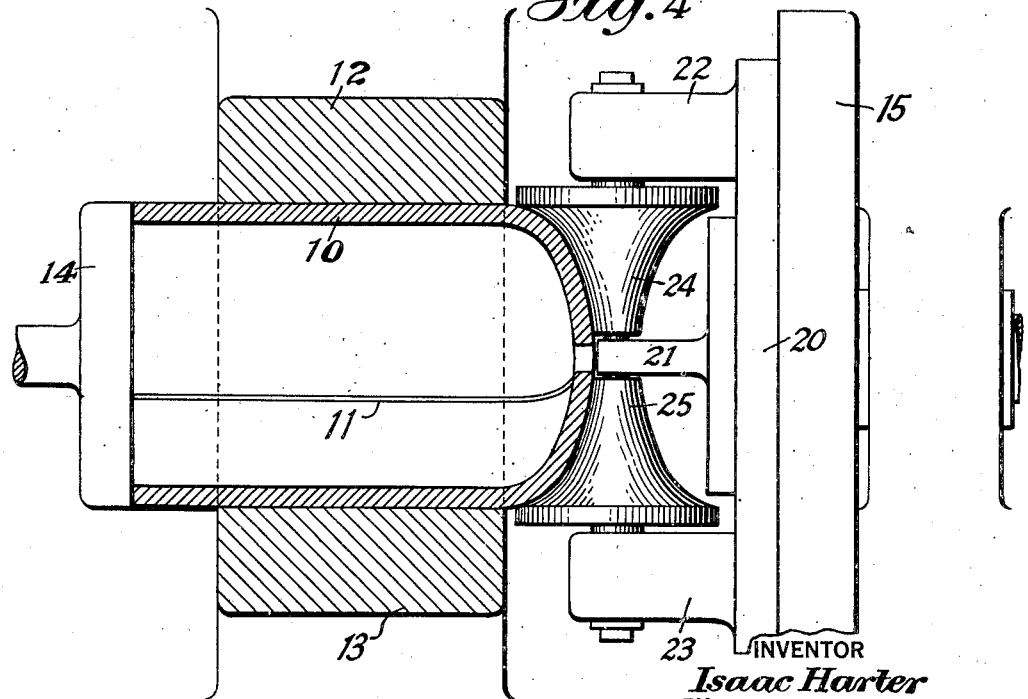
INVENTOR
*Isaac Harter*
BY
HIS ATTORNEY Feb. 11, 1936.  I. HARTER  2,030,818
METHOD OF FORMING A PRESSURE VESSEL
Filed March 7, 1932   5 Sheets-Sheet 3

INVENTOR
Isaac Harter
BY
HIS ATTORNEY

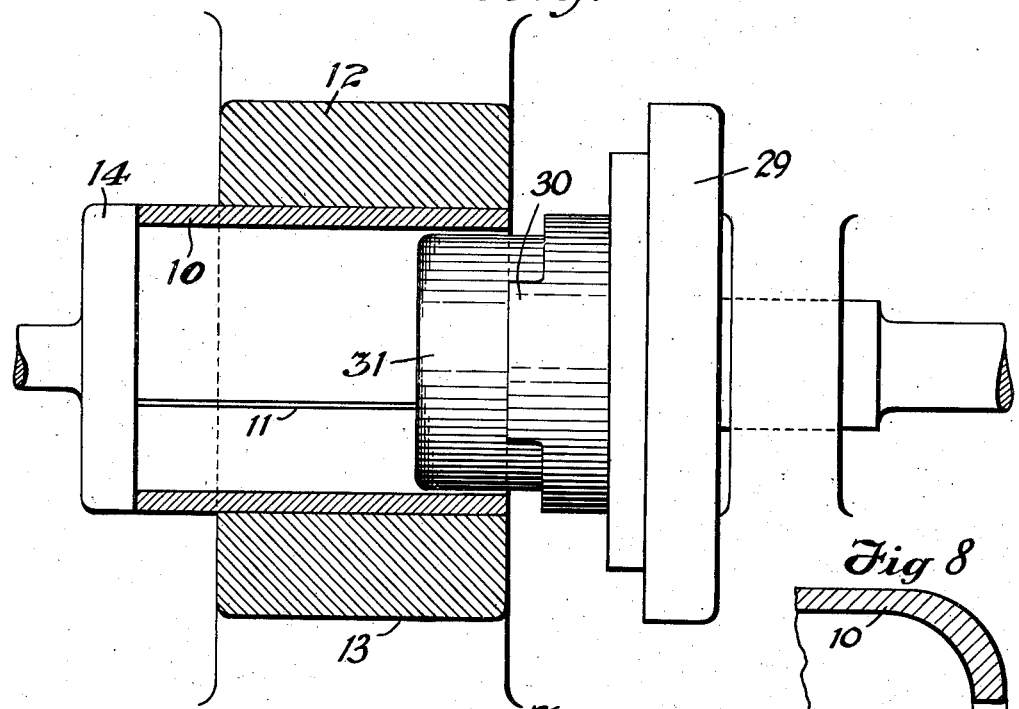
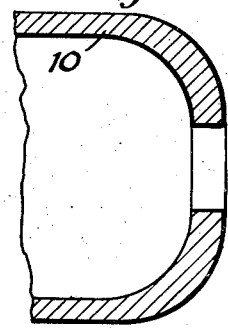
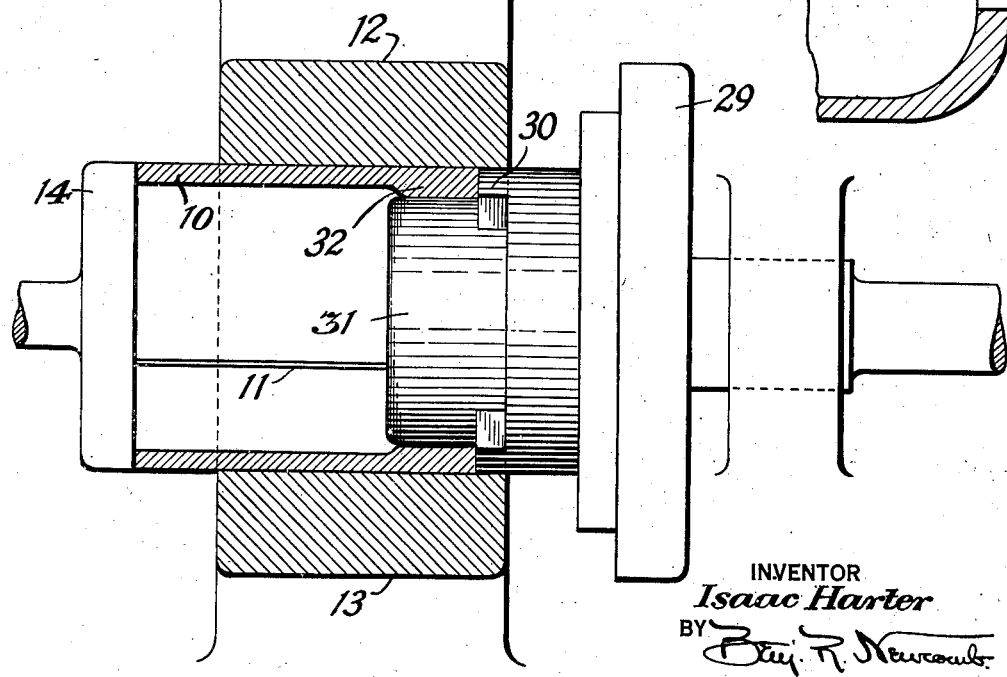

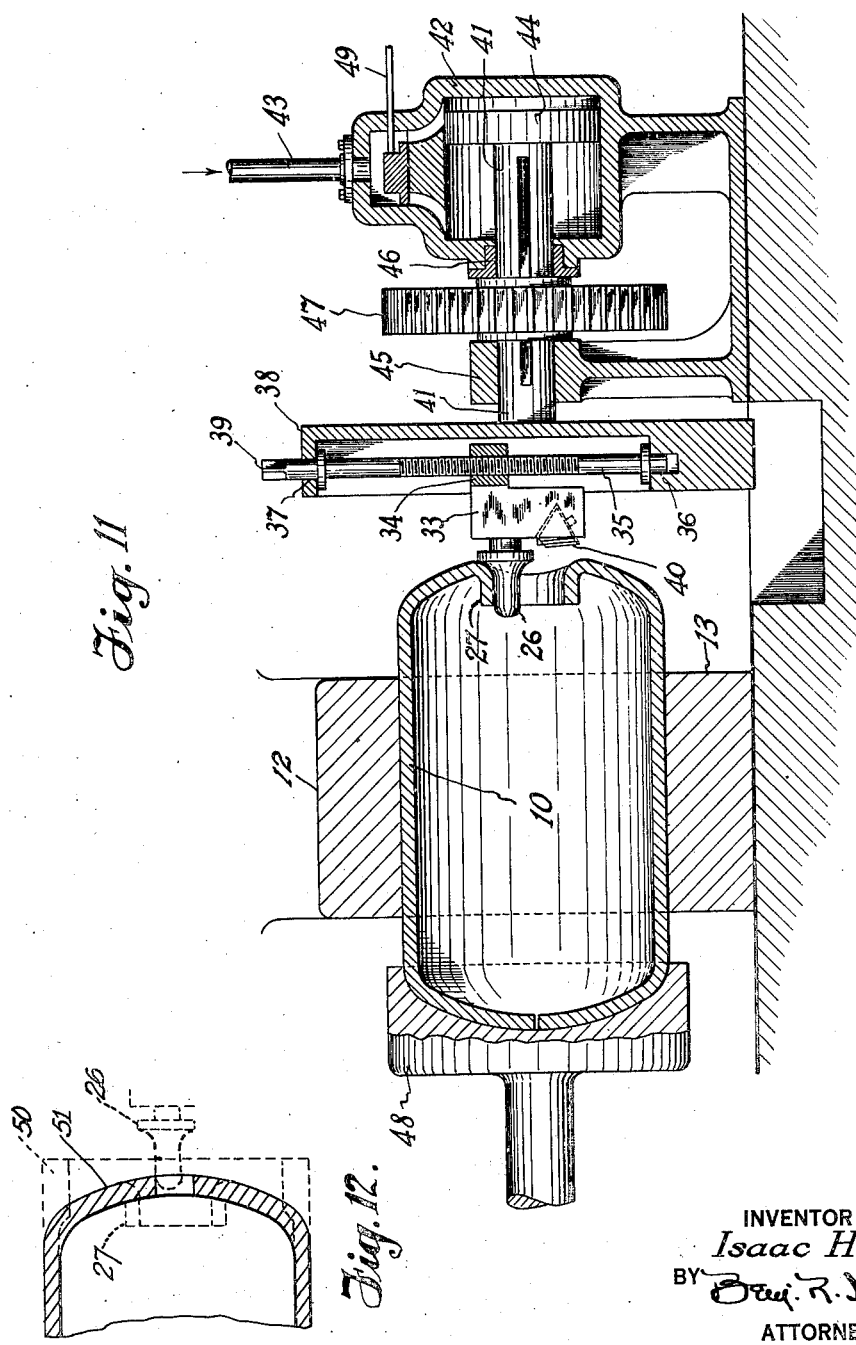

Patented Feb. 11, 1936

2,030,818

UNITED STATES PATENT OFFICE 2,030,818

METHOD OF FORMING A PRESSURE VESSEL

Isaac Harter, New York, N. Y., assignor to The Babcock & Wilcox Company, Bayonne, N. J., a corporation of New Jersey Application March 7, 1932, Serial No. 597,325

9 Claims. (Cl. 29—148.2)

This invention relates to the manufacture of pressure vessels, such as steam boiler drums, where the vessels or drums are subjected to very high internal pressures.

Such vessels are usually long cylinders provided with ends or heads, one end or the other usually being provided with a manhole opening. Because of the high pressures which are now used, the walls of such vessels may be two inches or more in thickness.

Because of the thickness of the metal, making such a vessel in riveted sections becomes substantially impossible, and it is necessary to build up such a vessel or drum out of a seamless cylinder or out of semi-cylindrical sections welded at their edges, usually by arc welding.

In the latter method, in practice, two or more segments of a cylinder are formed out of metal of the desired thickness. They are then located in proper cylindrical relation and their adjacent edges welded, as by arc welding, by depositing weld metal in spaces provided between them.

It has been found in practice that, if a section at the end of such a long weld shows a satisfactory joint between the drum sections, there is reasonable certainty that the remainder of the weld will also be satisfactory. In other words, a test applied to the end of such a weld shows the character of the weld throughout the remainder of the joint.

It is also desirable that the end or head of such a pressure vessel shall be formed integral with the cylindrical walls thereof, preferably with a wall thickness substantially that of the cylindrical portion, so that the vessel will have uniform strength throughout without any unnecessary metal, and it is one of the objects of the present invention to provide a method by which such a heavy-wall cylinder may be formed with an integral head.

It is also one of the objects of the present invention to provide a method by which such an integral head may be formed on a welded vessel and, at the same time, the quality of the weld be tested so that, if the weld is not a proper one, no further work on the vessel need be done, with the consequent waste of time and money.

The invention will be best understood from the following description of illustrative embodiments thereof, in connection with the accompanying drawings in which—

Fig. 1 shows a more or less diagrammatic arrangement by which an initial step, which sometimes may be used, may be carried out;

Figs. 2 and 3 show successive stages in the method by which the end metal is formed into the desired integral head;

Fig. 4 shows a finishing operation which may be used;

Fig. 8 shows a fragment of the end of a vessel having a somewhat different form of end wall; and Figs. 9 and 10 show successive steps in upsetting the metal preparatory to forming the head shown in Fig. 8.

Fig. 11 is a view in the nature of a longitudinal vertical section showing apparatus for moving the forging tool radially and longitudinally.

Fig. 12 is a detail view similar to that shown in Fig. 5, but indicating a thickened end wall similar to that shown in Fig. 8.

Figs. 1 to 4 illustrate successive steps to be followed in forming an integral head on a cylindrical shell with the wall of the head and the shell substantially the same. The shell, as illustrated, is formed of welded sections, though it will be understood that, for some purposes, a seamless shell may be used.

Figure 5:
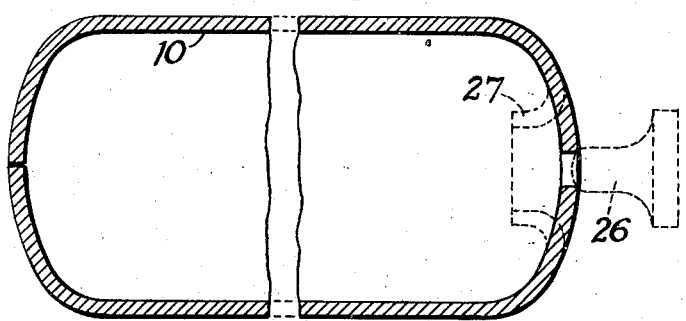
Figs. 5 and 6 show successive steps in forming a manhole opening and the internal manhole seat cover therefor which may be applied to vessels formed by the present method.

The illustrated shell 10 is made up of two or more cylindrical segments with their edges welded as at 11, such a weld usually being formed by depositing weld metal by an arc in the space between adjacent edges of the parent metal.

Because of the heavy pressures to which the vessels of the kind to which the present invention particularly relates are subject, such weld metal should be of substantially the same quality as to tensile strength, elongation and bending as the parent metal and the junctions between the weld metal and the parent metal should be such that they will stand the same strains as will any two adjacent portions of the parent metal itself. It is desirable, therefore, to test the quality of the weld metal and the weld junctions as early as possible in the manufacture of the vessel so that any later finishing operations on the vessel will not be wasted if the weld be defective.

The steps hereinafter to be described serve to test the weld, because, as pointed out above, the testing of the weld at the end of the shell will serve as a test of the remainder of the weld.

As a preferred method, the shell is gripped by suitable holding members or jaws 12, 13 and held at one end against axial pressure by a member 14 abutted against one end of the shell. The jaws 12, 13 preferably extend to the circumference of the shell where the integral head begins, the shell extending beyond this point a sufficient distance to provide the amount of metal necessary for the head.

In the drawings, Fig. 2, a rotatable face plate 15 is provided with a slide 16 on which is mounted a spindle 17 bearing a tool 18, which has a conical working face. The slide permits radial adjustment of the spindle and tool and means are provided by which the tool and the shell may be moved relatively axially of the shell, usually by moving the tool.

The end of the shell is heated to a forging heat and clamped in the jaws 12, 13. The tool 18 is then moved against the outer edge of the shell and the face plate turned to rotate the tool around the shell, motion axially of the shell being continued until the end is bent inwardly as indicated in dotted lines in Fig. 1. This step is not essential but is desirable since it makes the next step easier to begin. It is not material what shape the end takes in this operation, so long as the metal is moved inward sufficiently to permit the next tool to be applied at a point near the face of the jaws. It will also be understood that the pressure may be applied by moving the tool radially inward.

The shell is now ready, after reheating, if necessary, to have the head completed. The tool 19 is substituted for the tool 18 and is moved to a point close to the sides of the jaws with its curved working face against the bent-in surface of the shell and the face plate rotated to carry the tool around the shell.

Preferably, the forging pressure is applied by moving the tool axially of the shell. Hence the working point of the tool is located initially somewhat inside the outside diameter of the shell and then moved axially of the shell to the left in Fig. 2. The working pressure is thus applied to a zone on the shell near the circumference where the head begins. This pressure causes the metal to flow towards the right in Fig. 2 and is continued, in the form illustrated in Figs. 2 and 3, until the metal in the zone is deformed down to a thickness approximately that of the cylindrical wall of the shell.

Preferably, the tool is rotated in one direction around the shell for a time and then reversed, in the same zone. In this way, the tendency of the tool to twist or deform the metal into spirals is minimized.

Then the tool is withdrawn, moved inwardly radially and again pressed against a zone of the shell further to the right in Fig. 2 than the first zone, and the pressure continued until that zone is also of the thickness of the cylinder wall.

This method is continued step by step until the tool is in the position shown in Fig. 3, the head then being substantially completely drawn to the desired form, an opening preferably being left, as shown.

It will be observed that the metal in successive zones is deformed more and more as the end of the shell is approached, since the circumference of successive zones is progressively smaller, yet the original metal of such zones was all of the same circumference. Hence, the pressure or the time of the application of such pressure, or both, must be progressively increased toward the end of the shell, if the thickness of the head wall is to be approximately uniform and that of the cylindrical portion of the vessel.

By positioning the tool radially and controlling the axial movement thereof and the time of the application of pressure suitably for each zone, the workman can deform the metal the desired amount for that zone, measuring it as the deforming proceeds until the desired thickness is obtained.

If desired, a smoother surface on the head may be obtained by the arrangement shown in Fig. 4. The face plate 15 is provided with a support 20 carrying a center support 21 and end supports 22 and 23 on which, on suitable spindles, are mounted tools 24, 25, having their faces curved to the desired curvature of the head. Rotating the face plate with the tools pressing against the heated end of the shell will smooth out roughnesses left by the preceding tool.

Figure 6:
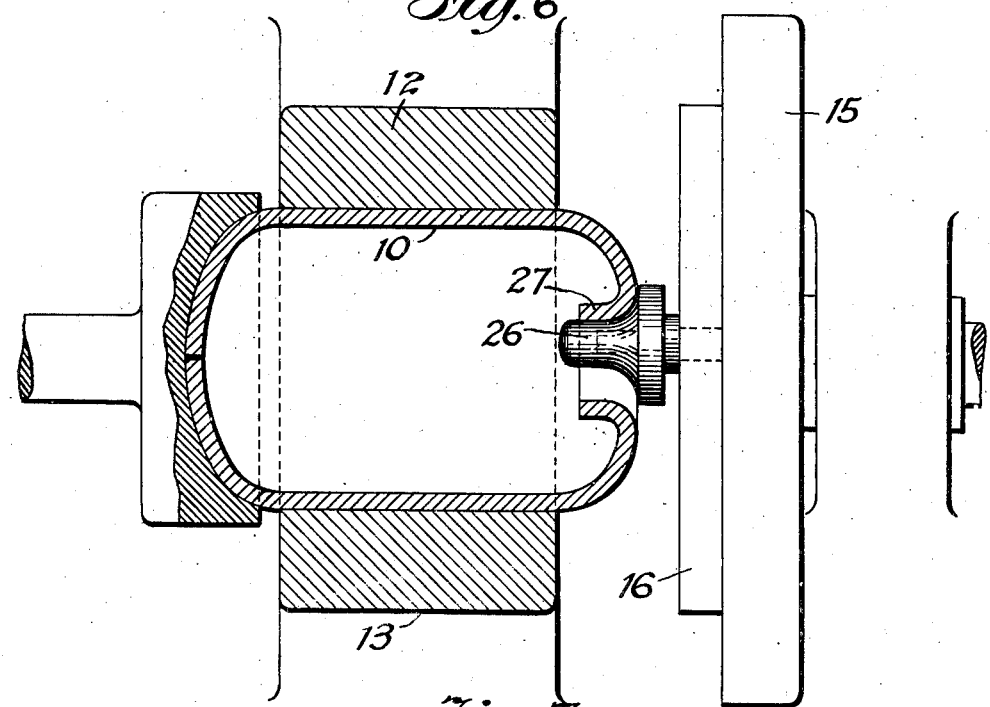
Figure 7:
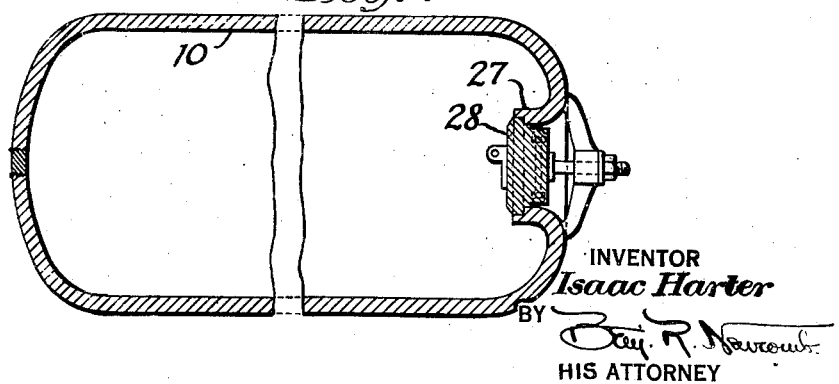
Fig. 7 shows such a vessel complete with the manhole cover in place.

If the vessel is to have a manhole and a cover therefor, the end of the vessel may be turned inward, as shown in Fig. 7, to form a seat for the cover. The completed drum, with the cover 28 in place, is shown in Fig. 7. The inturning, as at 27 (Figs. 5, 6) may be done with the tool 26, shown in dotted lines in Fig. 5 and in full lines in Fig. 6, mounted on the slide 16 of the face plate 15. The head being heated, the tool is forced into the opening left at the center of the head to cause the metal adjacent the edges of the opening to flow inward, the tool being successively positioned farther from the center of the face plate, until the desired size of opening and inward extension is obtained.

When the integral head pressure vessel is formed with a central opening such as a manhole, the metal working method such as that indicated in Figs. 5, 6, 7, and 12 is employed. Here, the forging operations are continued until the end of the cylinder or drum is developed into the toroidal form shown. Hence, the metal working method may be properly described as including a toroidal deforming of the end of the cylinder. This action, of course, results in the inwardly directed man-hole section 27.

Fig. 12 indicates the method involving the upsetting of the end of the cylindrical shell before the formation of the toroidal end of the drum. The upset end portion of the shell is indicated at 50 in the dotted lines, the metal in this upset portion being subsequently drawn and bent until it forms the wall 27 of the man-hole opening. The section 51 in solid lines indicates the position and thickness of the metal of the end wall at an intermediate stage in the operation.

In some cases, instead of making the head of uniform thickness, it may be desired to form the head with a section such as is shown in Fig. 8, with a flat inner surface against which a manhole cover can be drawn.

While thickening of this character may be obtained to some extent by merely applying pressure from such a tool as 19 (Figs. 2, 3) without continuing the pressure until the metal is of uniform thickness, the accumulation of metal from the mere bending-in of the end portion of the cylinder without much deforming giving the gradual thickening toward the center of the head, the thickness may be increased to the desired amount by first upsetting the end of the shell. Figs. 9 and 10 illustrate a convenient method for this.

A hammer-like tool 30 is mounted on a plate 29 supported to have endwise motion, the tool having a cylindrical portion 31 and the hammer faces being less than the entire periphery of the tool. In the form illustrated, the hammer is provided with two oppositely-disposed faces of approximately 90° extent.

The shell, with its end heated, is gripped in the jaws 12, 13 in the position shown in Fig. 9 and the hammer forced against the end of the shell in successive blows, being rotated between successive blows. These "blows" may be merely heavy, slow pressures, sufficient to cause the shell metal to flow.

The cylindrical end 31 of the tool is about the desired internal diameter of the upset end and, since it is inside the shell as the metal is upset, it limits the internal diameter of the upset portion, compelling the metal to be upset over the desired length of the cylinder end instead of merely directly at the end in an irregular and uncertain manner as might be the case if the cylindrical end of the tool were not present.

After the end is thus upset, the shell may have an integral head forged thereon, as before, except that now the metal will have the increased thickness as shown in Fig. 8.

It will be observed that, in forming the head, as in Figs. 1, 2 and 3, the weld metal, if the shell is a welded one, is drawn lengthwise and is also bent, as is the parent metal which surrounds it. In addition, the drag of the tool, under the heavy pressure, exerts a heavy cross pressure on the junction of the weld metal with the parent metal. If, under the strains and stresses thus produced, no visible cracks or openings appear in the weld, the completion of the vessel may be proceeded with with reasonable confidence in the character of the weld, not only in the head, but also in the cylindrical portion of the vessel, since the entire weld will have been made under the same conditions and of the same metal.

If desired, the quality of a weld in a shell may be tested by forging in an inturned flange in the manner described, even where the end of the vessel is not to have an integral head.

It will be understood that the working of the metal to form the integral head may be done by moving the tool in a spiral; that is, with progressive simultaneous motion of the tool radially and axially, but, because of the heavy section and the slow flow of the metal, the method of working zones described above is preferable.

Fig. 11 of the drawings indicates apparatus which is adapted to carry out the metal working methods disclosed in this case. Here, the forging tool 26 is rotatably carried in a cross head 33, which has an extension 34 screw threaded to receive a shaft 35. This shaft in turn is rotatably mounted in bearings 36 and 37 formed in the rotatable member or face plate 38. The squared end 39 of the shaft may be turned to change the radial position of the working tool 26. Preferably, the cross head 33 also carries a second forging tool 40 rotatably mounted thereon as shown.

The member 38 is non-rotatably mounted upon a shaft 41 the end of which extends into a fluid pressure cylinder 42. Fluid under pressure is supplied through the pipe 43 to press the piston head 44 in either direction according to the position of the governing means 49. The piston head 44 is mounted on the end of the shaft 41 as shown, and the shaft 41 is rotatably mounted in bearings 45 and 46. Any suitable drive pinion, (not shown) may mesh with the gear 47 to do the actual driving.

It will be understood that the apparatus shown in Fig. 11 is operative while the drum blank 10 is gripped between the members 12 and 13 and held against longitudinal movement away from the forging tool by the member 48.

I claim:

1. The method of making a heavy-wall cylindrical pressure vessel with an integral head, which comprises forming a cylindrical shell with one or more longitudinal arc welds connecting edges of the parent metal of the shell and with the wall thickness of the shell substantially uniform, then heating to forging heat the end portion of the shell, and then applying pressure by a rotating tool, capable of adjustment radially and axially of the shell, around successive zones at the heated end portion of the shell beginning at the outer edge of the head, to form a head integral with the cylindrical walls of the shell, the pressure being applied at each zone to cause the metal of the shell end portion to flow toward the axis of the shell, and continuing such pressure at each zone until the wall thickness thereof is equal approximately to that of the cylindrical portion of the shell.

2. The method of making a heavy-wall cylindrical pressure vessel with an integral head, which comprises forming a cylindrical shell with one or more longitudinal arc welds connecting edges of the parent metal of the shell and with the wall thickness of the shell substantially uniform, then heating to forging heat the end portion of the shell, and then applying pressure to the metal of the end portion to cause it to flow toward the axis of the shell to form a head on the shell integral therewith, the pressure being applied progressively from a point away from the end of the shell towards said end until the metal is of substantially the thickness of the wall of the cylindrical portion of the shell, and simultaneously drawing and bending the weld metal to test its quality and its adherence to the parent metal of the shell.

3. The method of making a heavy-wall cylindrical pressure vessel which includes forming a long cylindrical shell with at least one longitudinal arc weld connecting edges of the parent metal of the shell, heating a short end portion of the shell and then testing the weld by applying pressure by a rotating tool around successive zones of the heated end portion beginning at the cylindrical wall of the shell, to cause the metal of the end portion, including the weld therein, to flow toward the axis of the shell into a flange extending inwardly at an obtuse angle to its original position, whereby flaws will be developed in the metal of the weld and in its connection to the parent metal if the weld metal is not substantially integral with the parent metal and of substantially the same quality as the parent metal as to bending and elongation.

4. The method of making a cylindrical pressure vessel with an integral head having a manhole therein and an internal manhole cover seat, which comprises forming a cylindrical shell having an integral head thereon with a relatively small central opening through the head and then applying the pressure of a rotating tool against the edges of said opening and axially of the cylinder to bend the edges of the opening inwardly of the cylinder, and then applying the pressure radially outward to further enlarge the opening.

5. In the making of a heavy-wall pressure vessel, the method of upsetting the end of a heavy-wall cylinder, which comprises heating to forging heat the end to be upset, gripping and supporting externally the end to be upset, subjecting the end of the cylinder to hammer blows directed over relatively small areas of the end and at successive points around the end and limiting the radial extent of the upsetting by inserting a cylindrical block inside the end being upset during the hammering operation, the external diameter of the block being approximately the desired internal diameter of the finished upset end, and then turning in the upset end portion of the cylinder by a rotating forging operation until an end wall of substantially the same thickness as the original cylinder is formed.

6. In the making of a heavy-wall pressure vessel, forming a heavy-wall hollow cylinder with at least one longitudinal arc weld, heating to forging heat an end of the cylinder which is to be upset, gripping and supporting externally the end of the cylinder to be upset, subjecting the end of the cylinder to hammer blows directed over relatively small areas of the end and at successive points around the end to form an upset or thickened end portion, and then working the metal of the cylinder by applying pressure to the metal of the end portion to cause it to flow toward the axis of the cylinder to form a head on the cylinder integral therewith, the pressure being applied progressively from a point away from the end of the cylinder towards said end until the metal is of substantially the same thickness as the wall of the cylinder, the working of the cylinder metal involving the simultaneous drawing and bending the weld metal to test its quality and its adherence to the parent metal of the cylinder.

7. In the making of a heavy-wall pressure vessel, forming a heavy-wall hollow cylinder with at least one longitudinal arc weld, heating to forging heat an end of the cylinder to be upset, gripping and supporting externally the end of the cylinder to be upset, subjecting the end of the cylinder to hammer blows directed over relatively small areas of the end and at successive points around the end to form an upset or thickened end portion, and then working the metal of the cylinder by applying pressure to the metal of the end portion to cause it to flow toward the axis of the cylinder to form a head which is integral therewith and of a thickness substantially uniform and equal to that of the main part of the cylinder, the pressure being applied progressively from a point away from the end of the cylinder towards said end until the metal is of substantially the thickness of the wall of the cylinder, the working of the metal of the end of the cylinder involving the simultaneous drawing and bending the weld metal to test its quality and its adherence to the parent metal of the cylinder.

8. In the making of a heavy-wall pressure vessel, forming a heavy-wall hollow cylinder with one or more longitudinal arc welds, heating to forging heat an end of the cylinder, gripping and supporting externally the heated end, subjecting the heated end to hammer blows directed over relatively small areas of the end and at successive points around the end and limiting the radial extent of the upsetting by inserting a cylindrical block inside the end being upset during the hammering operation, then applying pressure to the upset portion by a rotating tool capable of adjustment radially and axially of the shell, around successive zones at the heated end portion of the shell beginning at the outer edge of the head, to form an annulus or head integral with the cylindrical walls of the shell, the pressure being applied at each zone to cause the metal of the upset portion to flow toward the axis of the shell until the annulus forms an end wall, and then further deforming the wall axially and radially of the annulus to provide a manhole wall a part of which substantially constitutes an inwardly directed hollow cylinder, the manhole constituting an additionally reduced aperture the wall area of which incorporates the metal of the surplus thickness resulting from the preceding step, said upsetting and other forging operations testing the weld and causing flaws to be developed in the weld if it is not satisfactory and if the weld metal is not substantially integral with the parent metal and of substantially the same quality as the parent metal as to bending and elongation.

9. In the making of a heavy-wall pressure vessel, forming a heavy-wall hollow cylinder shell with one or more longitudinal arc welds, heating to forging heat an end of the cylinder, gripping and supporting externally the heated end, subjecting the heated end to upsetting operations in which hammer blows are directed over relatively small areas of the end and at successive points around the end, then applying pressure to the upset portion by a rotating tool capable of adjustment radially and axially of the shell around successive zones at the heated end portion of the shell beginning at the edge of the shell, to form an annulus or head integral with the cylindrical walls of the shell, the pressure being applied at each zone to cause the metal of the upset portion of flow toward the axis of the shell, continuing such pressure at each zone until the desired thickness of wall at that point is obtained, and then further deforming the wall axially and radially of the annulus to provide an additionally reduced aperture the wall of which incorporates the metal of the surplus thickness resulting from the preceding step, the upsetting and the subsequent forging operations involving a drawing and bending of the weld metal to test the quality of the weld.

ISAAC HARTER.